United States Patent
Young et al.

(10) Patent No.: US 8,077,710 B2
(45) Date of Patent: Dec. 13, 2011

(54) METHOD AND SYSTEM FOR DISCOVERING VACANT DTV CHANNELS USING DHCP SERVER LOCATION

(75) Inventors: Song-Lin Young, Vancouver, WA (US); Daniel J. Park, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 643 days.

(21) Appl. No.: 12/072,660

(22) Filed: Feb. 27, 2008

(65) Prior Publication Data

US 2009/0217333 A1 Aug. 27, 2009

(51) Int. Cl.
*H04L 12/28* (2006.01)
(52) U.S. Cl. ......... 370/389; 709/222; 709/223; 709/228
(58) Field of Classification Search .................. 370/252, 370/389, 392; 709/220, 222, 223, 227, 228
See application file for complete search history.

(56) References Cited

U.S. PATENT DOCUMENTS

| | | | |
|---|---|---|---|
| 6,861,984 B2 * | 3/2005 | Rabinowitz et al. .......... 342/464 |
| 7,100,204 B1 | 8/2006 | Myllymaki et al. ............ 726/22 |
| 7,154,437 B2 | 12/2006 | Bromley et al. ......... 342/357.12 |
| 7,256,681 B1 | 8/2007 | Moody et al. ................ 340/10.1 |
| 2001/0047407 A1 * | 11/2001 | Moore et al. .................. 709/223 |
| 2004/0137901 A1 * | 7/2004 | Hamasaki et al. ............ 455/436 |
| 2007/0168866 A1 * | 7/2007 | Khare et al. .................. 715/723 |
| 2009/0003330 A1 * | 1/2009 | Li et al. ......................... 370/389 |
| 2011/0051703 A1 * | 3/2011 | Fulknier et al. ............... 370/338 |

OTHER PUBLICATIONS

Cordeiro et al., IEEE 802.22: An Introduction to the First Wireless Standard based on Cognitive Radios, Journal of Communications, vol. 1, No. 1, Apr. 2006, pp. 38-47.
J. Polk et al., Dynamic Host Configuration Protocol Option for Coordinate-based Location Configuration Information, IETF RFC 3825, Jul. 2004, 15 pages.

* cited by examiner

*Primary Examiner* — Luat Phung
(74) *Attorney, Agent, or Firm* — Scot A. Reader

(57) ABSTRACT

A wireless client device (e.g. a WSD) discovers vacant DTV channels using location information acquired from a Dynamic Host Configuration Protocol (DHCP) server. In one aspect of the invention, a wireless client device discovers vacant DTV channels through direct communication with a local DHCP server and a remote primary user database server. In another aspect of the invention, a wireless client device discovers vacant DTV channels from an access device that communicates with a local DHCP server and a remote primary user database server.

12 Claims, 8 Drawing Sheets

Figure 7

| Code 123 | 16 | LaRes | Latitude | |
|---|---|---|---|---|
| Latitude (cont'd) | | | LoRes | |
| Longitude | | | | |
| AT | AltRes | Altitude | | |
| Alt (cont'd) | Datum | | | |

METHOD AND SYSTEM FOR DISCOVERING VACANT DTV CHANNELS USING DHCP SERVER LOCATION

BACKGROUND OF THE INVENTION

The present invention relates to unlicensed wireless communications on vacant digital television (DTV) channels and, more particularly, to a method and system through which a wireless client device discovers vacant DTV channels.

Once the transition to DTV is completed in February 2009, proposed rules promulgated by the Federal Communications Commission (FCC) would permit wireless client devices to use for unlicensed communications DTV channels that are not used in a particular geographic area for DTV station or other primary user (e.g. licensed wireless microphone device) transmissions. Such vacant DTV channels are often referred to as White Space, and such wireless client devices are sometimes called White Space Devices, or WSDs.

To avoid interfering with primary user transmissions, a WSD must prior to transmitting discover which DTV channels are vacant, that is, what part of the local DTV broadcast spectrum is White Space. Such information is typically acquired by querying a remote primary user database using the WSD's known location and resolving a vacant channel list from the local DTV station and other local primary user information contained in the query response.

A common problem associated with vacant DTV channel discovery is that the WSD may not know its own location. One way for a WSD to discover its location is from the Global Positioning System (GPS). However, a WSD may not be equipped with a GPS receiver. Moreover, GPS receivers can suffer from poor indoor performance as coverage and reception within buildings is often severely restricted. Adding a GPS receiver to a WSD also may be considered overkill since a WSD does not need to know its location with GPS-like precision in order to determine which DTV channels in its vicinity are vacant. A location accurate within a few hundred meters will generally suffice.

Another way that a WSD might discover its location is Internet Protocol (IP) Geolocation. In IP Geolocation, a web server maps the source IP address in a received packet to a physical address of an organization that owns the IP address as listed in the American Registry for Internet Numbers (ARIN). However, this method for location discovery is error prone, as users of IP addresses owned by an organization often access the Internet from locations that are remote from the physical address of the organization registered with ARIN.

SUMMARY OF THE INVENTION

The present invention, in a basic feature, provides a method and system by which a wireless client device (e.g. a WSD) discovers vacant DTV channels using location information acquired from a Dynamic Host Configuration Protocol (DHCP) server.

In one aspect of the invention, a wireless client device discovers vacant DTV channels through direct communication with a local DHCP server and a remote primary user database server. Such a wireless client device in some embodiments comprises a processor and a network interface communicatively coupled with the processor, wherein under control of the processor the client device transmits via the network interface a DHCP request in response to which a DHCP response having location information is received, wherein under control of the processor the client device transmits via the network interface a primary user information request based at least in part on the location information in response to which local primary user information is received, and wherein under control of the processor the client device determines vacant DTV channel information based at least in part on the local primary user information.

In some embodiments, under control of the processor the client device establishes communication on a vacant DTV channel identified using the vacant DTV channel information.

In some embodiments, the location information comprises latitude, longitude and altitude coordinates.

In some embodiments, the location information comprises a resolution indicator for each of the latitude, longitude and altitude coordinates.

In some embodiments, the local primary user information comprises location, channel frequency, power and service area information for one or more local DTV stations.

In some embodiments, the DHCP response assigns an IP address to the client device.

In another aspect of the invention, a wireless client device discovers vacant DTV channels from an access device that communicates with a local DHCP server and a remote primary user database server. Such an access device in some embodiments comprises a processor and a plurality of network interfaces communicatively coupled with the processor, wherein under control of the processor a DHCP request is transmitted in response to which a DHCP response having location information is received, wherein under control of the processor the access device transmits via a first network interface a primary user information request based at least in part on the location information in response to which local primary user information is received, and wherein under control of the processor the access device determines and broadcasts via a second network interface vacant DTV channel information based at least in part on the local primary user information.

In some embodiments, under control of the processor the access device broadcasts the vacant DTV channel information on a vacant DTV channel identified using the vacant DTV channel information.

In some embodiments, the location information comprises latitude, longitude and altitude coordinates.

In some embodiments, the location information comprises a resolution indicator for each of the latitude, longitude and altitude coordinates.

In some embodiments, the local primary user information comprises location, channel frequency, power and service area information for one or more local DTV stations.

In some embodiments, the DHCP response assigns an IP address to the access device.

In another aspect of the invention, a method for discovering vacant DTV channels comprises the steps of transmitting a DHCP request, receiving in response to the DHCP request a DHCP response having location information, transmitting a primary user information request based at least in part on the location information, receiving in response to the primary user information request local primary user information and determining vacant DTV channel information based at least in part on the local primary user information.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIG. 7 shows the format for a DHCP Location Configuration Information (LCI) element.

DETAILED DESCRIPTION OF A PREFERRED EMBODIMENT

Figure 1:
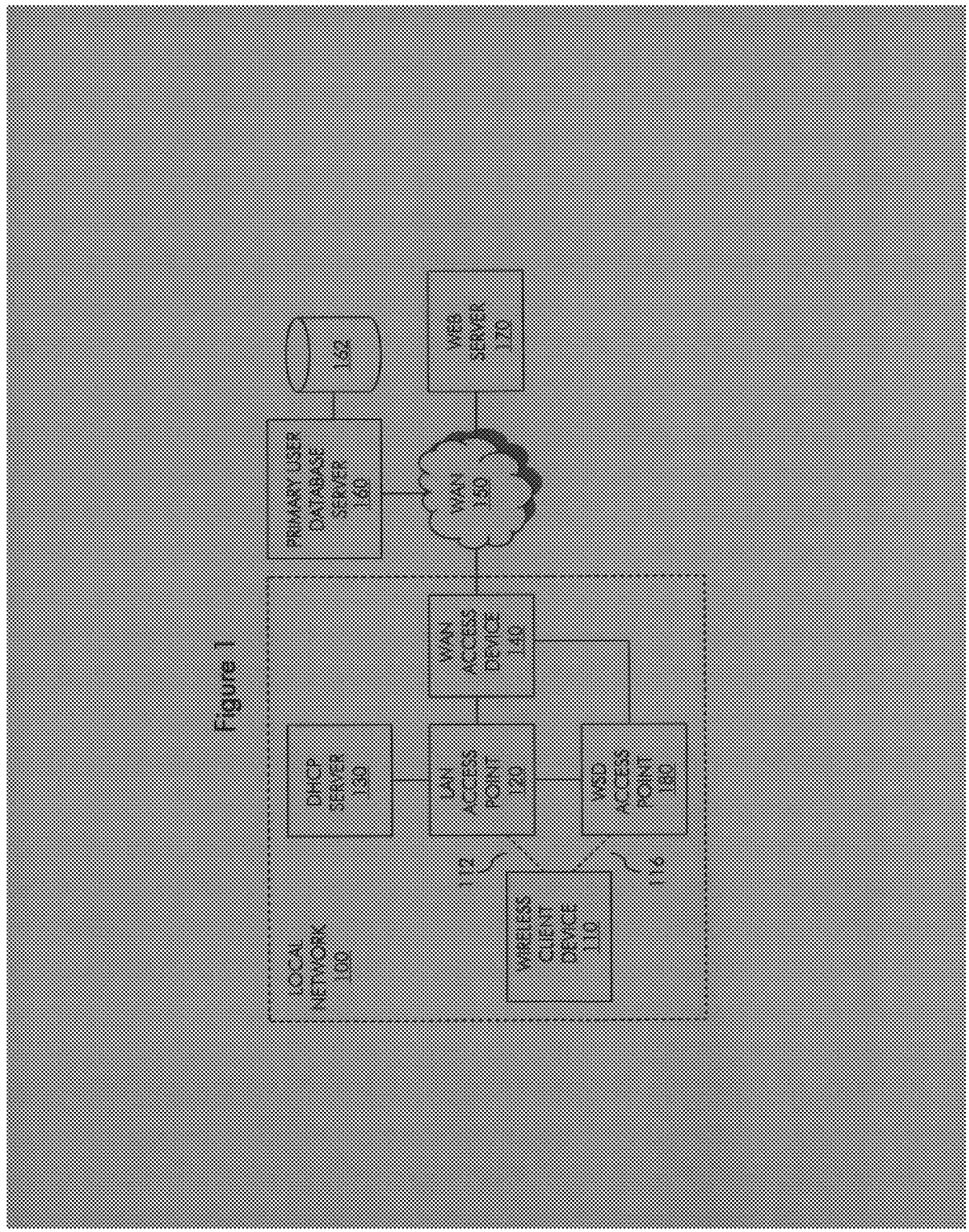
FIG. 1 shows a communication system in some embodiments of the invention.

In FIG. 1, a communication system in some embodiments of the invention is shown. In these embodiments, a wireless client device 110 discovers vacant DTV channels through direct communication with a local DHCP server 130 and a remote primary user database server 160.

The system of FIG. 1 includes a local network 100 communicatively coupled with remote primary user database server 160 and Web server 170 via a wide area network (WAN) 150. Local network 100 covers an area on the order of 1,000 square meters or less. In some embodiments, local network 100 is a residential network. In other embodiments, local network 100 is an enterprise network. In still other embodiments, local network 100 is a public "hot spot". Local network 100 includes a wireless client device 110 that accesses WAN services by communicatively coupling to either a local area network (LAN) access point 120 or a WSD access point 180 over a LAN link 112 or a WSD link 116, respectively. Local network 100 also includes a DHCP server 130. Local network 100 further includes a WAN access device 140 that provides a gateway between local network 100 and WAN 150.

Figure 2:
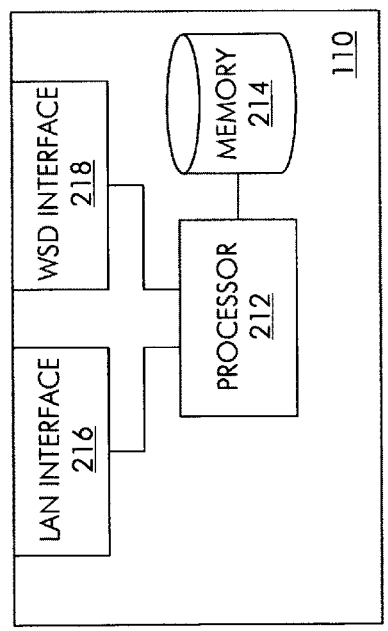
FIG. 2 shows a wireless client device in the communication system of FIG. 1.

Client device 110 is shown in more detail in FIG. 2. Client device 110 is an electronic appliance, such as a personal computer, personal data assistant (PDA), telephone, camera or other consumer electronics device, that has a processor 112 communicatively coupled with a memory 114, a LAN interface 116 and a WSD interface 118. LAN interface 116 may include a wired interface (e.g. IEEE 802.3), a wireless interface (e.g. IEEE 802.11), or both. Memory 114 includes DHCP client software executable by processor 112 for issuing DHCP requests via LAN interface 116 and White Space discovery software executable by processor 112 for issuing local primary user information requests via LAN interface 116 and resolving local primary user information acquired in local primary user information responses to vacant DTV channel information. Memory 114 further includes Web browser software executable by processor 112 for accessing WAN services, such as hosted services offered by Web server 170, via WSD interface 118. In some embodiments, memory 114 may include additional or different software for accessing WAN services, such as email, instant messaging, streaming audio/video, Internet gaming and/or Internet telephony software.

LAN access point 120 is a LAN access device, such as an IEEE 802.3 Ethernet switch or IEEE 802.11 wireless access point, that has multiple LAN interfaces, a processor and a switching element for forwarding packets between the multiple interfaces based on identifiers (e.g. MAC addresses) included in the packets.

DHCP server 130 is an electronic appliance having software executable by a processor for receiving and processing DHCP requests and transmitting DHCP responses. DHCP responses include dynamically assigned IP addresses and location information. Location information includes longitude, latitude and altitude coordinates for DHCP server 130 and associated resolution indicators, all of which may be preconfigured on DHCP server 130. In some embodiments, the location information is carried in DHCP responses in an LCI element as defined in Internet Engineering Task Force (IETF) Request for Comment (RFC) 3825.

WAN access device 140 is a gateway device having at least one LAN interface and at least one WAN interface. In some embodiments, WAN access device 140 is an IP router having an integrated modem, such as a Digital Subscriber Line (DSL) or cable modem. In other embodiments, WAN access device 140 consists of a stand alone IP router and a stand alone WAN access modem.

WAN 150 is a communication network that includes multiplexing devices, such as routers, switches and bridges, that forward packets between multiple interfaces based on identifiers (e.g. MAC addresses, IP addresses) included in the packets. In some embodiments, WAN 150 traverses part of the public Internet.

Primary user database server 160 is an electronic appliance having software executable by a processor for receiving and processing primary user information requests and transmitting responses including local primary user information. DTV station server 160 resolves primary user information requests by consulting a primary user mapping database 162 that includes mappings of locations and primary user information, such as DTV station information.

Primary user mapping database 162 is a repository that stores operating parameters for primary users of DTV channels, such as DTV stations. In some embodiments, database 162 has a table of allotments for DTV operations that specifies locations (latitude, longitude, altitude), channel frequencies, Effective Isotropic Radiated Power (EIRP) and service areas of all DTV stations active in the United States and its territories.

Web server 170 is an electronic appliance having software executable by a processor for receiving and processing requests, such as Hypertext Transfer Protocol (HTTP) requests, for hosted services and transmitting responses, such as HTTP responses, to the requests.

WSD access point 180 is a WSD access device that has at least one WSD interface, at least one LAN interface, a processor and a switching element for forwarding packets between the multiple interfaces based on identifiers (e.g. MAC addresses) included in the packets.

In some embodiments, two or more of LAN access point 120, DHCP server 130, WAN access device 140 and WSD access point 180 are co-located on a single multifunction electronic appliance, such as a broadband router. In these embodiments, communication between co-located components may be realized through internal message flows over internal communication interfaces rather than the LAN message flows hereinafter described.

Figure 3:
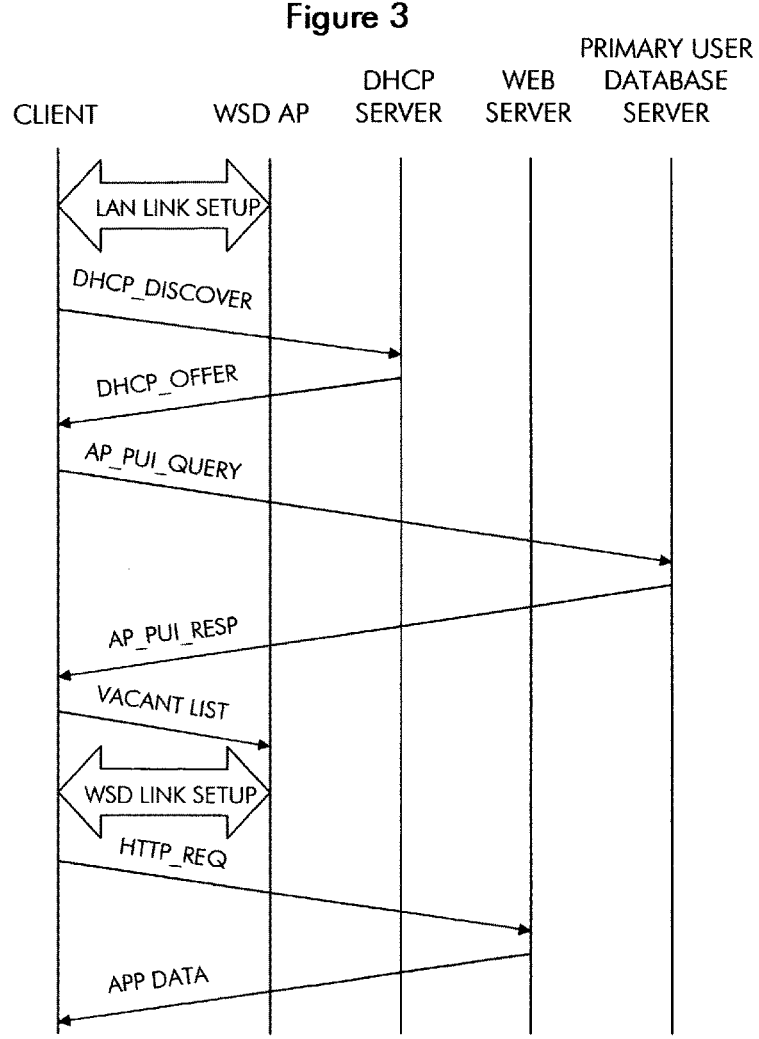
FIG. 3 shows message flows within the communication system of FIG. 1.

FIG. 3 shows message flows used to discover and establish connectivity on vacant DTV channels within the communication system of FIG. 1. Client device 110 boots-up and establishes LAN connectivity via LAN access point 120 using well-known LAN handshaking procedures. Client device 110 then issues a DHCP request (DHCP_DIS- COVER) that is forwarded to DHCP server 130. In response, DHCP server 130 assigns an IP address to client device 110 and transmits a DHCP response (DHCP_OFFER) to client device 110 that has the assigned IP address and location information. The DHCP response may be transmitted in one or more packets. The location information is carried in an LCI element that includes latitude, longitude and altitude coordinates for DHCP server 130 as well as associated resolution indicators. The resolution indicators are associated with respective geopositional coordinates and indicate how many bits of the LCI fields that carry their respective geopositional coordinates are valid. Any bits entered in the subject LCI fields to the right of the indicated number of bits are invalid and are to be ignored by client device 110.

In other embodiments, such as where a client device has a static IP address, a DHCP request/response sequence may be invoked to discover location information without IP address assignment.

In some embodiments, the latitude, longitude and altitude coordinates and their associated resolution indicators are manually preconfigured on DHCP server 130 by a network administrator. In these embodiments, the latitude, longitude and altitude coordinates reflect an estimate by the network administrator of the geographic position of DHCP server 130. In other embodiments, DHCP server 130 may be equipped with a GPS receiver and computational logic that determine the latitude, longitude and altitude coordinates and their associated resolution indicators. In either event, because DHCP server 130 is local to client device 110, client device 110 discovers its approximate location from the geopositional coordinates delivered by DHCP server 130 in the DHCP response.

Client device 110 receives the DHCP response and generates a primary user information request (PUI_QUERY) using location information from the DHCP response. In some embodiments, the information request includes all geopositional information included in the LCI element. In other embodiments, the information request includes a subset of geopositional information from the LCI element and/or derivative geopositional information. In any event, client device 110 transmits the information request to primary user database server 160. Primary user database server 160 consults primary user mapping database 162 and resolves geopositional information from the information request to information for primary users local to the geoposition, such as local DTV station information. Such local primary user information in some embodiments includes a list of DTV stations broadcasting in the vicinity of the geoposition identified by the geopositional information and their operating characteristics, such as location, channel frequency, power and service area. Primary user database server 160 transmits to client device 110 a primary user information response (PUI_RESP) containing the local primary user information.

Client device 110 receives the primary user information response and determines vacant DTV channel information using the local primary user information. In some embodiments, the vacant DTV channel information includes a list of vacant DTV channels. Client device 110 executes White Space discovery software to identify vacant DTV channels based on operating characteristics of local primary users identified in the local primary user information. Vacant DTV channels are channels that client device 110 determines with a high degree of certainty, if transmitted on by client device 110, would not interfere with local primary user transmissions, such as local DTV station broadcasts. Client device 110 transmits the list of vacant DTV channels (VACANT LIST) via LAN link 112 and the list is forwarded to WSD access point 180.

Client device 110 next starts well-known WSD handshaking procedures and establishes connectivity via WSD link 116 with WSD access point 180 on a vacant DTV channel. Handoff procedures, such as IEEE 802.21 Media Independent Handover, may be invoked to ensure seamless transition from LAN link 12 to WSD link 116.

Client device 110 then issues an HTTP request (HTTP_REQ) to Web server 170 via WSD link 116 to invoke a service hosted by Web server and receives application data (APP DATA) from Web server 170 in response to the request.

Figure 4:
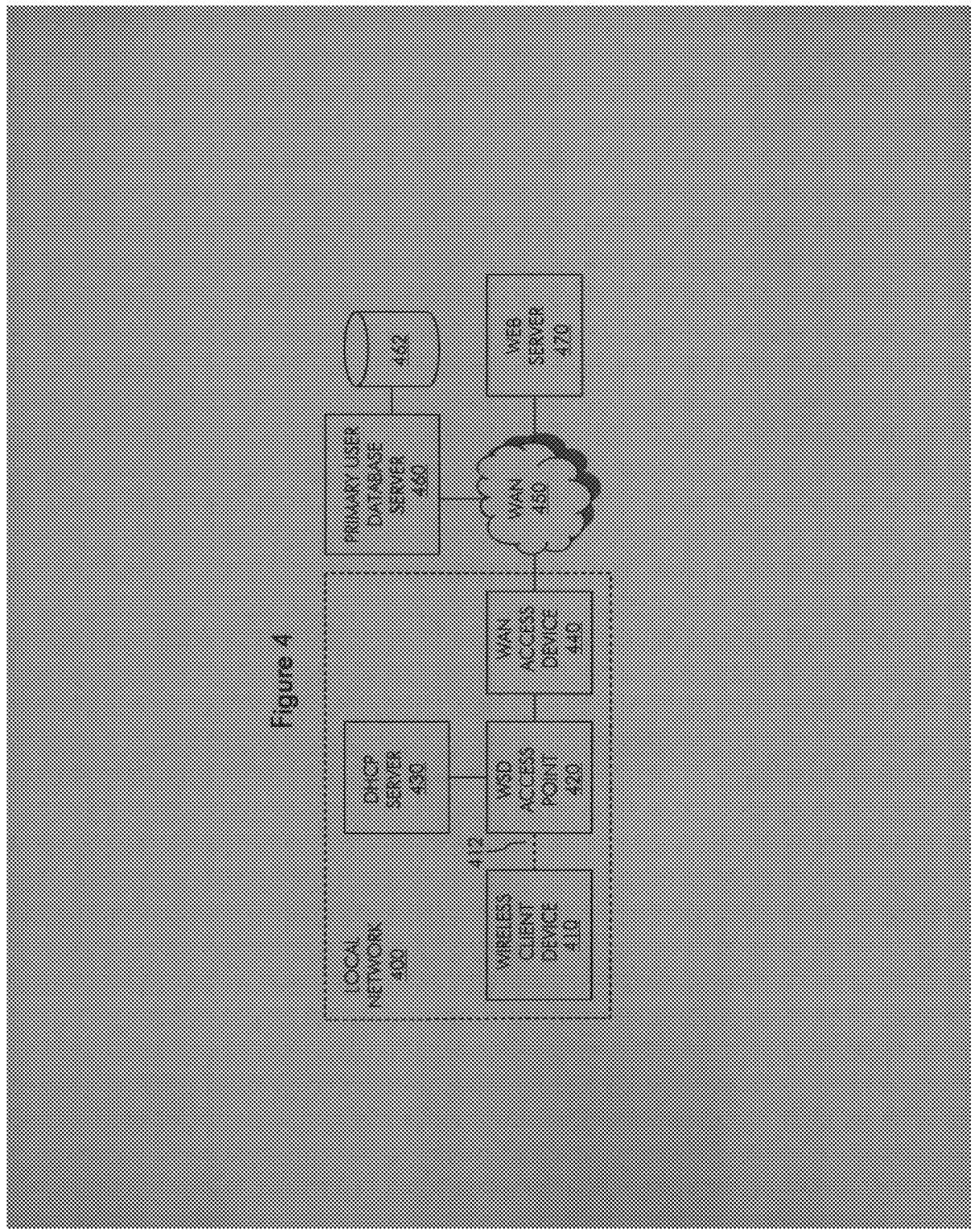
FIG. 4 shows a communication system in other embodiments of the invention.

In FIG. 4, a communication system in other embodiments of the invention is shown. In these embodiments, a wireless client device 410 discovers vacant DTV channels from a WSD access point 420 that communicates with a local DHCP server 430 and a remote primary user database server 460.

The system of FIG. 4 includes a local network 400 communicatively coupled with remote primary user database server 460 and Web server 470 via a WAN 450. Local network 400 covers an area on the order of 1,000 square meters or less. Local network 400 may be, for example, a residential network, enterprise network or public "hot spot". Local network 400 includes a wireless client device 410 that accesses WAN services by communicatively coupling to a WSD access point 420 over a WSD link 412. Local network 400 also includes a DHCP server 430. Local network 400 further includes a WAN access device 440 that provides a gateway between local network 400 and WAN 450.

Client device 410 is an electronic appliance, such as a personal computer, PDA, telephone, camera or other consumer electronics device, that has a processor and a WSD interface. Client device 410 includes a DHCP client for issuing DHCP requests. Client device 410 further includes Web browser software executable by the processor for accessing WAN services, such as hosted services offered by Web server 470.

Figure 5:
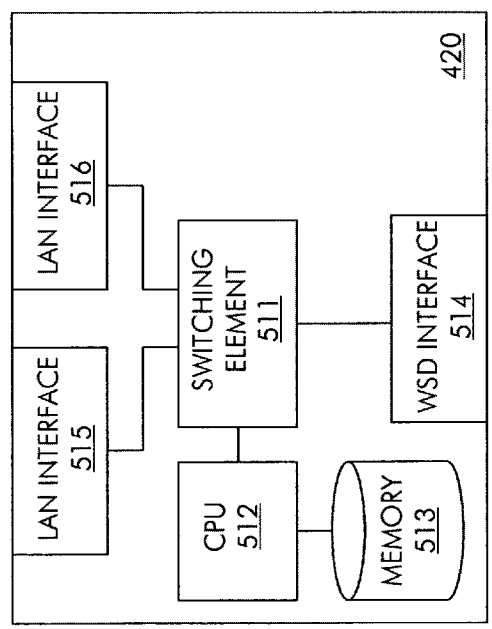
FIG. 5 shows a WSD access point in the communication system of FIG. 4.

WSD access point 420 is shown in more detail in FIG. 5. WSD access point 420 is a WSD access device that has a WSD interface 514 and a plurality of LAN interfaces 515, 516 communicatively coupled via a switching element 511 that forwards packets between the plural interfaces based on identifiers (e.g. MAC addresses) included in the packets. WSD access point 420 further includes a processor (CPU) 512 and an associated memory 513 that includes DHCP client software executable by processor 512 for issuing DHCP requests via LAN interface 515 and White Space discovery software executable by processor 512 for issuing primary user information requests via LAN interface 516, resolving local primary user information acquired in primary user information responses received via LAN interface 516 to vacant DTV channel information and broadcasting vacant DTV channel information via WSD interface 514.

DHCP server 430 is an electronic appliance having software executable by a processor for receiving and processing DHCP requests and transmitting DHCP responses. DHCP responses include dynamically assigned IP addresses and location information. Location information includes longitude, latitude and altitude coordinates for DHCP server 430 and associated resolution indicators, all of which may be preconfigured on DHCP server 430. In some embodiments, the location information is carried in DHCP responses in an LCI element as defined in IETF RFC 3825.

WAN access device 440 is a gateway device having at least one LAN interface and at least one WAN interface. In some embodiments, WAN access device 440 is an IP router having an integrated modem, such as a DSL or cable modem. In other embodiments, WAN access device 440 consists of a stand alone IP router and a stand alone WAN access modem.

WAN 450 is a communication network that includes multiplexing devices, such as routers, switches and bridges, that forward packets between multiple interfaces based on identifiers (e.g. MAC addresses, IP addresses) included in the packets. In some embodiments, WAN 450 traverses part of the public Internet.

Primary user database server 460 is an electronic appliance having software executable by a processor for receiving and processing primary user information requests and transmitting responses including local primary user information. Primary user database server 460 resolves primary user information requests by consulting a primary user mapping database 462 that has mappings of locations and primary user information, such as DTV station information.

Primary user mapping database 462 is a repository that stores operating parameters for primary users of DTV channels, such as DTV stations. In some embodiments, database 462 has a table of allotments for DTV operations that includes locations (latitude, longitude, altitude), channel frequencies, EIRP and service areas of all DTV stations active in the United States and its territories.

Web server 470 is an electronic appliance having software executable by a processor for receiving and processing requests, such as HTTP requests, for hosted services and transmitting responses, such as HTTP responses, to the requests.

In some embodiments, two or more of WSD access point 420, DHCP server 430 and WAN access device 440 are co-located on a single multifunction electronic appliance, such as a broadband router. In these embodiments, communication between co-located components may be achieved through internal message flows over internal communication interfaces rather than the LAN message flows hereinafter described.

Figure 6:
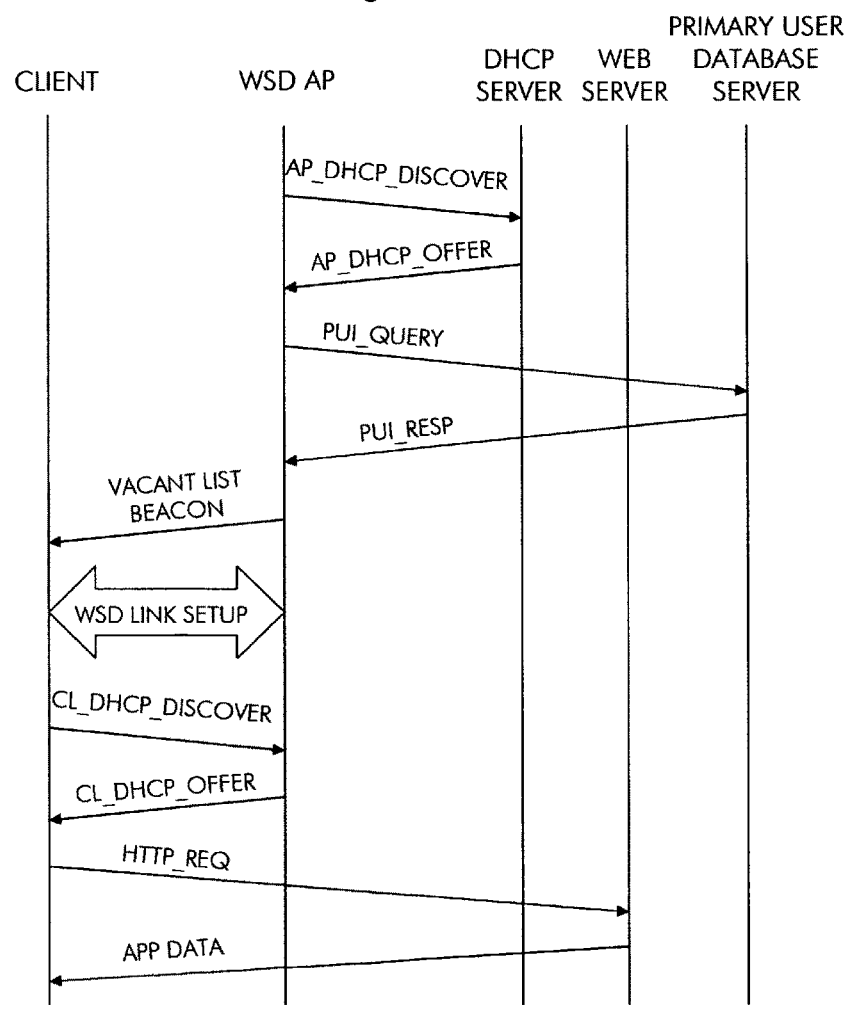
FIG. 6 shows message flows within the communication system of FIG. 4.

FIG. 6 shows message flows used to discover and establish connectivity on vacant DTV channels within the communication system of FIG. 4. WSD access point 420 boots-up and establishes LAN connectivity to DHCP server 430 using well-known LAN handshaking procedures. WSD access point 420 issues a DHCP request (AP_DHCP_DISCOVER) to DHCP server 430. In response, DHCP server 430 assigns an IP address to WSD access point 420 and transmits a DHCP response (AP_DHCP_OFFER) to WSD access point 420 that has the assigned IP address and location information. The DHCP response may be transmitted in one or more packets. The location information is carried in an LCI element that includes latitude, longitude and altitude coordinates for DHCP server 430 as well as associated resolution indicators.

In some embodiments, the latitude, longitude and altitude coordinates and their associated resolution indicators are manually entered on DHCP server 430 by a network administrator. In these embodiments, the latitude, longitude and altitude coordinates reflect an estimate by the network administrator of the geographic position of DHCP server 430. In other embodiments, DHCP server 430 may be equipped with a GPS receiver and computational logic that determine the latitude, longitude and altitude coordinates and their associated resolution indicators. In either event, because DHCP server 430 is local to WSD access point 420, WSD access point 420 discovers its approximate location from geopositional coordinates delivered by DHCP server 430 in the DHCP response. And since WSD access point 420 is local to wireless client device 410, client device 410 can utilize vacant DTV channel information provided by WSD access point 420 using the location information.

WSD access point 420 receives the DHCP response and generates a primary user information request (AP_PUI_QUERY) using location information from the DHCP response. In some embodiments, the information request includes all geopositional information included in the LCI element. In other embodiments, the information request includes a subset of geopositional information from the LCI element and/or derivative geopositional information. In any event, WSD access point 420 transmits the information request to primary user database server 460. Primary user database server 460 consults primary user mapping database 462 and resolves geopositional information from the information request to the information for primary users local to the geoposition. In some embodiments, such local primary user information includes a list of DTV stations broadcasting in the vicinity of the geoposition identified by the geopositional information and their operating characteristics, such as location, channel frequency, power and service area. Primary user database server 460 transmits to WSD access point 420 a primary user information response (AP_PUI_RESP) containing the local primary user information, such as local DTV station information.

WSD access point 420 receives the primary user information response and determines vacant DTV channel information using the local primary user information. In some embodiments, the vacant DTV channel information includes a list of vacant DTV channels. WSD access point 420 executes White Space discovery software to identify vacant DTV channels based on operating characteristics of local DTV stations identified in the local primary user information. Vacant DTV channels are those that WSD access point 420 determines with a high degree of certainty, if transmitted on by client device 410, would not interfere with local primary user transmissions, such as local DTV station broadcasts. WSD access point 420 composes a beacon message including a vacant channel list (VACANT LIST BEACON) and broadcasts the beacon on all vacant DTV channels.

Client device 410 receives the beacon message having the vacant channel list. Client device 410 then using well-known WSD handshaking procedures establishes connectivity with WSD access point 420 on a vacant DTV channel via WSD link 412.

In other embodiments, client device 410 resolves the vacant channel list implicitly attendant to demodulating the WSD beacon messages broadcast on all channels.

Client device 410 next issues a DHCP request (CL_DHCP_DISCOVER) that is forwarded to DHCP server 430. In response, DHCP server 430 assigns an IP address to client device 410 and transmits a DHCP response (CL_DHCP_OFFER) to client device 410 that has the assigned IP address.

Client device 410 then issues an HTTP request (HTTP_REQ) to Web server 470 via WSD link 412 to invoke a service hosted by Web server and receives application data (APP DATA) from Web server 470 in response to the request.

FIG. 7 shows the format of a DHCP LCI element as defined in IETF RFC 3825. An eight-bit code field includes the tag "123" assigned to the DHCP LCI option and is followed by an eight-bit length field that indicates that the LCI element includes 16 bytes. The length field is followed by a six-bit latitude resolution identifier (LaRes) that indicates how many of bits of the 34-bit fixed-point value of latitude in the latitude field that follows are valid. The latitude field is followed by a six-bit longitude resolution (LoRes) field that indicates how many of bits of the 34-bit fixed-point value of longitude in the longitude field that follows are valid. The four-bit AT field specifies the altitude type of the fixed-point value of altitude in the altitude field (e.g. meters). The AT field is followed by a six-bit altitude resolution identifier (AltRes) that indicates how many of bits of the 30-bit value of altitude in the altitude field that follows are valid. Lastly, the eight-bit datum field indicates the map datum used for the coordinates given (e.g. World Geodesic System 1984, North American Datum 1983).

Figure 8:
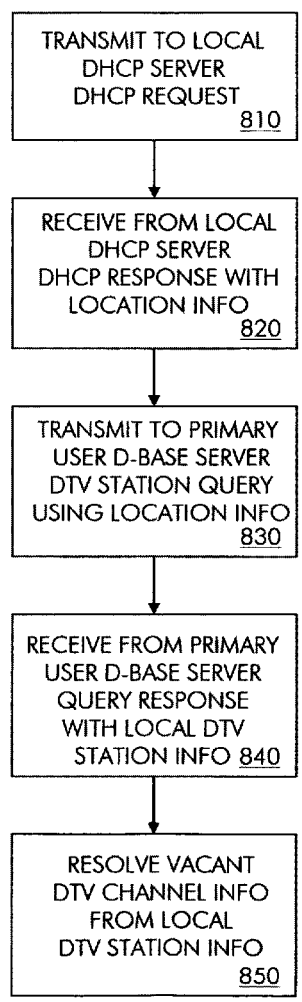
FIG. 8 illustrates a method performed by a requesting device for discovering vacant DTV channels in some embodiments of the invention.

FIG. 8 illustrates a method performed by a requesting device for discovering vacant DTV channels in some embodiments of the invention. Such a requesting device may be, for example, a wireless client device or access device. The requesting device transmits a DHCP request to a local DHCP server (810), in response to which the requesting device receives a DHCP response having location information for the local DHCP server (820). The requesting device then transmits a primary user query formulated using the location information to a remote DTV station server (830), in response to which the requesting device receives a primary user query response having local primary user information (e.g. operational information for DTV stations near the location identified by location information in the DTV station query) (840). The requesting device resolves vacant DTV channel information from the local primary user information (850), which may then be applied by the requesting device to establish WSD connectivity on a vacant DTV channel, or forwarded by the requesting device to another device for establishing WSD connectivity on a vacant DTV channel.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. An access point, comprising:
a processor; and
one or more network interfaces communicatively coupled with the processor, wherein under control of the processor the access point originates and transmits a Dynamic Host Configuration Protocol (DHCP) request in response to which a DHCP response including location information is received, wherein the location information comprises latitude, longitude and altitude coordinates and a resolution indicator for each of the latitude, longitude and altitude coordinates, wherein under control of the processor the access point originates and transmits via at least one of the network interfaces a primary user information request based at least in part on the location information in response to which the access point receives via at least one of the network interfaces local primary user information, and wherein under control of the processor the access point determines and broadcasts via at least one of the network interfaces vacant digital television (DTV) channel information based at least in part on the local primary user information;
wherein the local primary user information comprises a location, channel information, power and service area for each locally broadcasting DTV station.

2. The access point of claim 1, wherein the access point establishes connectivity with a client device via at least one of the network interfaces on a vacant DTV channel in response to the broadcast.

3. The access point of claim 1, wherein the local primary user information comprises a list of locally broadcasting DTV stations.

4. The access point of claim 1, wherein the vacant DTV channel information is broadcast on a vacant DTV channel identified based at least in part on the local primary user information.

5. The access point of claim 1, wherein the vacant DTV channel information comprises a vacant DTV channel list.

6. The access point of claim 1, wherein the DHCP response includes an Internet Protocol (IP) address assigned to the access point in response to the DHCP request.

7. A method performed by an access point for discovering and disseminating vacant DTV channel information, comprising the steps of:
originating and transmitting by the access point a DHCP request;
receiving by the access point a DHCP response responsive to the DHCP request and including location information comprising latitude, longitude and altitude coordinates and a resolution indicator for each of the latitude, longitude and altitude coordinates;
originating and transmitting by the access point a primary user information request based at least in part on the location information;
receiving by the access point local primary user information responsive to the primary user information request;
determining by the access point vacant DTV channel information based at least in part on the local primary user information; and
broadcasting by the access point the vacant DTV channel information;
wherein the local primary user information comprises a location, channel information, power and service area for each locally broadcasting DTV stations.

8. The method of claim 7, further comprising the step of establishing by the access point connectivity with a client device on a vacant DTV channel in response to the broadcast.

9. The method of claim 7, wherein the local primary user information comprises a list of locally broadcasting DTV stations.

10. The method of claim 7, wherein the vacant DTV channel information is broadcast on a vacant DTV channel identified based at least in part on the local primary user information.

11. The method of claim 10, wherein the vacant DTV channel information comprises a vacant DTV channel list.

12. The method of claim 7, wherein the DHCP response includes an IP address assigned to the access point in response to the DHCP request.

* * * * *

UNITED STATES PATENT AND TRADEMARK OFFICE
CERTIFICATE OF CORRECTION

| | | |
|---|---|---|
| PATENT NO. | : 8,077,710 B2 | Page 1 of 1 |
| APPLICATION NO. | : 12/072660 | |
| DATED | : December 13, 2011 | |
| INVENTOR(S) | : Young et al. | |

It is certified that error appears in the above-identified patent and that said Letters Patent is hereby corrected as shown below:

Column 10, Line 42, "stations" is replaced with --station--.

Signed and Sealed this
Twenty-eighth Day of February, 2012

David J. Kappos
*Director of the United States Patent and Trademark Office*